United States Patent
Inston

(10) Patent No.: US 8,747,585 B2
(45) Date of Patent: Jun. 10, 2014

(54) METHOD AND APPARATUS FOR FABRICATING A FIBRE REINFORCED THERMOPLASTIC COMPOSITE STRUCTURE

(75) Inventor: David Inston, Bristol (GB)

(73) Assignee: Airbus Operations Ltd, Bristol (GB)

( * ) Notice: Subject to any disclaimer, the term of this patent is extended or adjusted under 35 U.S.C. 154(b) by 539 days.

(21) Appl. No.: 12/992,901

(22) PCT Filed: Jun. 22, 2009

(86) PCT No.: PCT/GB2009/050710
§ 371 (c)(1),
(2), (4) Date: Nov. 16, 2010

(87) PCT Pub. No.: WO2009/156754
PCT Pub. Date: Dec. 30, 2009

(65) Prior Publication Data
US 2011/0065888 A1    Mar. 17, 2011

(30) Foreign Application Priority Data

Jun. 24, 2008 (GB) .................. 0811548.7

(51) Int. Cl.
*B32B 37/00* (2006.01)
(52) U.S. Cl.
USPC .............................. 156/64; 156/272.8; 428/98
(58) Field of Classification Search
USPC ............ 156/73.1, 272.2, 272.8, 379.6, 379.8, 156/379.9, 580.1, 580.2; 428/98
See application file for complete search history.

(56) References Cited

U.S. PATENT DOCUMENTS

| | | | |
|---|---|---|---|
| 3,765,973 A | 10/1973 | Kramer | |
| 6,773,527 B2 * | 8/2004 | Campbell et al. | 156/73.1 |
| 7,896,994 B2 * | 3/2011 | Soccard | 156/64 |
| 2003/0188819 A1 | 10/2003 | Campbell et al. | |
| 2008/0210360 A1 | 9/2008 | Soccard | |

FOREIGN PATENT DOCUMENTS

| | | |
|---|---|---|
| DE | 3242478 | 11/1982 |
| DE | 10122802 | 4/2001 |
| DE | 10235892 | 8/2002 |
| EP | 0158528 | 10/1985 |
| EP | 0261850 | 3/1988 |
| FR | 2887800 | 1/2007 |
| JP | 60239224 | 5/1984 |
| JP | 62055121 | 3/1987 |
| JP | 2007313778 | 12/2007 |
| WO | 0012279 | 3/2000 |
| WO | 2008029178 | 3/2008 |

OTHER PUBLICATIONS

Yousefpour, Ali, "Fusion Bonding/Welding of Thermoplastic Composite Materials," vol. 17, No. 4, XP009100998, Jan. 1, 2004.
UK Search Report for Application No. GB0811548.7 mailed Oct. 16, 2008.
International Search Report for PCT/GB2009/050710 mailed Oct. 12, 2009.

* cited by examiner

*Primary Examiner* — James Sells
(74) *Attorney, Agent, or Firm* — Lowe Hauptman & Ham, LLP

(57) ABSTRACT

A method of fabricating a fiber reinforced thermoplastic composite structure comprising: placing a first layer of fiber reinforced thermoplastic material on top of a second layer of fiber reinforced thermoplastic material; providing a local heating source and locally heating a portion of at least the upper layer of thermoplastic composite material; and providing an ultrasonic transducer and locally introducing ultrasonic energy waves to the heated portion of the thermoplastic material such that ultrasonic consolidation of the fiber reinforced thermoplastic occurs.

7 Claims, 2 Drawing Sheets

Figure 1:
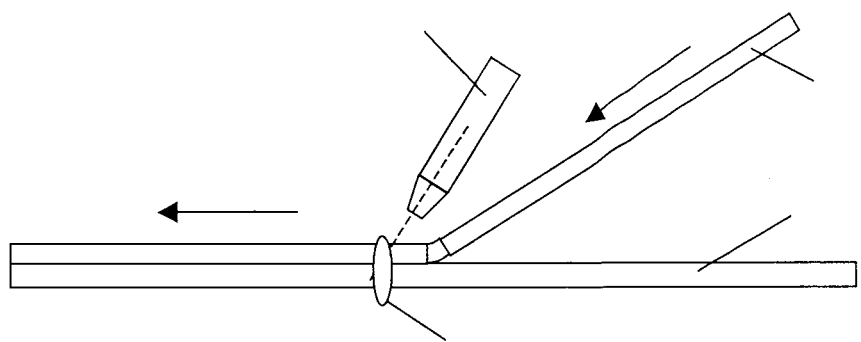

METHOD AND APPARATUS FOR FABRICATING A FIBRE REINFORCED THERMOPLASTIC COMPOSITE STRUCTURE

RELATED APPLICATIONS

The present application is a national phase of PCT/GB2009/050710, filed Jun. 22, 2009 and is based on, and claims priority from, Great Britain Application Number 0811548.7, filed Jun. 24, 2008.

Composite materials are now commonly used as structural materials in a variety of fields of endeavour. One such area is the aerospace industry in which structural composite materials are used to form an increasing proportion of an aircraft structure. Within this context a composite material is considered to be a polymer matrix reinforced with fibres or a mesh, most typically carbon fibres but possibly fibres of other material or a metallic mesh. The composite materials tend to fall within one of two main families of materials, those composites having thermoplastic matrices and those having thermoset matrices. Thermoset composites need to be cured, a process by which the chemical structure of the polymer matrix is irreversibly changed, usually by the application of heat and optionally pressure. Once cured, the thermoset composite has its final properties of rigidity, hardness and strength and cannot be reverted to its un-cured pliable condition. In contrast, thermoplastic composites do not require curing, having their required structural properties when cool and softening when heated. Thermoplastic composites may be repeatedly softened by heat and hardened by cooling, since when heated they undergo a substantially physical, rather than chemical, change.

Both thermoplastic and thermoset composites can be formed into thin flexible sheets or fibres. This allows composite components to be formed by laying down the composite material in a moulding tool, with the thickness of the component being locally varied according to the number of layers of composite laid down and also the direction of one or more layers being controllable so as to control the final structural properties of the formed composite component. The laid up components are then "consolidated", a process which in both cases involves heating the composite structure such that the thermoset or thermoplastic matrix softens to a sufficient degree so as to form a single unified matrix and applying sufficient pressure to the softened matrix to expel any trapped air from the matrix and also to allow the reinforcing fibres to 'settle' within the matrix.

In terms of final structural properties, thermoplastic composites have superior impact and damage resistance properties to those of thermoset composites and are generally tougher and more resistant to chemical attack, all of which are preferable properties within aerospace applications. Furthermore, since thermoplastic composites may be repeatedly reheated and remoulded they are inherently recyclable, which is an increasing important consideration.

The act of "laying up" the individual layers of fibre reinforced composite material prior to the laid up stack being consolidated can be done by hand. However, this is very time consuming and requires skilled labour to achieve good results and is therefore relatively expensive and not suitable for large scale production of composite structures. To address this issue automatic tape laying (ATL) and automatic fibre placement (AFP) techniques and apparatus have been developed, in which composite material tape or fibres are continuously fed from a large roll of material to a tape or fibre laying head that automatically places the composite material in the desired position. Since this process is automated and mechanised the speed and accuracy are greatly increased over manually laying up the composite material. In a further advancement of this technique when used with fibre reinforced thermoset composite materials, localised heating of the fibres or tape just after they have been laid down is performed, for example using an infrared laser or hot gas torch, the localised heating causing either complete or partial consolidation of the thermoset matrix as the composite material is laid down. Since a subsequent consolidation process is either completely removed or can be achieved in a shortened time due to the partial consolidation that has already been achieved by the local heating, this technique further reduces the time required to fabricate thermoset composite structures. In a particular refinement of this technique the localised heating is achieved by introducing ultrasonic wave energy into the thermoset composite matrix using an ultrasonic transducer. The ultrasonic wave energy causes the thermoset matrix material to vibrate at ultrasonic frequencies and these vibrations themselves give rise to a localised heating within the thermoset material, thus achieving the desired complete or partial consolidation. However, this technique of ultrasonic tape laying, as it is referred, has to date not been achieved in an efficient and quick manner when used with thermoplastic composite materials. It is therefore desirable to provide a method and apparatus for performing ultrasonic tape laying with thermoplastic composite materials that does achieve the desired speed and efficiency.

According to a first aspect of the present invention there is provided a method of fabricating a fibre reinforced thermoplastic composite structure comprising placing a first layer of fibre reinforced thermoplastic material on top of a second layer of fibre reinforced thermoplastic material, providing a local heating source and locally heating a portion of the upper and lower layers, and providing an ultrasonic transducer and locally introducing ultrasonic energy waves to the heated portion of the thermoplastic material such that ultrasonic consolidation of the fibre reinforced thermoplastic material occurs.

Relative movement preferably occurs between on the one hand the first layer of fibre reinforced thermoplastic material and on the other hand the localised heating source and ultrasonic transducer.

The first layer of fibre reinforced thermoplastic material is preferably provided in a continuous length and may be placed onto the second layer of fibre reinforced thermoplastic material in a continuous manner. Preferably, the local heating and introduction of ultrasonic energy occur at a portion of the thermoplastic layers proximal to a point at which the first layer of fibre reinforced thermoplastic material is placed onto the second layer.

The portion of the fibre reinforced thermoplastic material layers is preferably heated to a temperature within the glass transition phase of the fibre reinforced thermoplastic material. Additionally the portion of fibre reinforced thermoplastic material may be locally heated to a temperature within a range extending substantially from the glass transition temperature and extending to a temperature 5° C. above a temperature corresponding to a peak value of the Tan delta of the thermoplastic material. Most preferably the portion of fibre reinforced thermoplastic material may be locally heated to a temperature substantially equal to a temperature corresponding to the peak value of the Tan delta of the temperature material.

The local heating source may comprise an infrared laser.

According to a further aspect of the present invention there is provided a fibre reinforced thermoplastic composite structure manufactured according to the method of the first aspect of the present invention.

According to a third aspect of the present invention there is provided an apparatus for fabricating a fibre reinforced thermoplastic composite structure comprising a localised heat source arranged to heat a portion of a stack of fibre reinforced thermoplastic layers and an ultrasonic transducer arranged to locally introduce ultrasonic energy waves into the heated portion of the fibre reinforced thermoplastic material layers such that ultrasonic consolidation of the layers occurs.

The localised heating source an ultrasonic transducer or preferably arranged to move relative to the stack of fibre reinforced thermoplastic layers.

In preferred embodiments the local heating source comprises an infrared laser.

Preferably, the apparatus comprises an ultrasonic tape laying apparatus in combination with the localised heat source.

Figure 2:
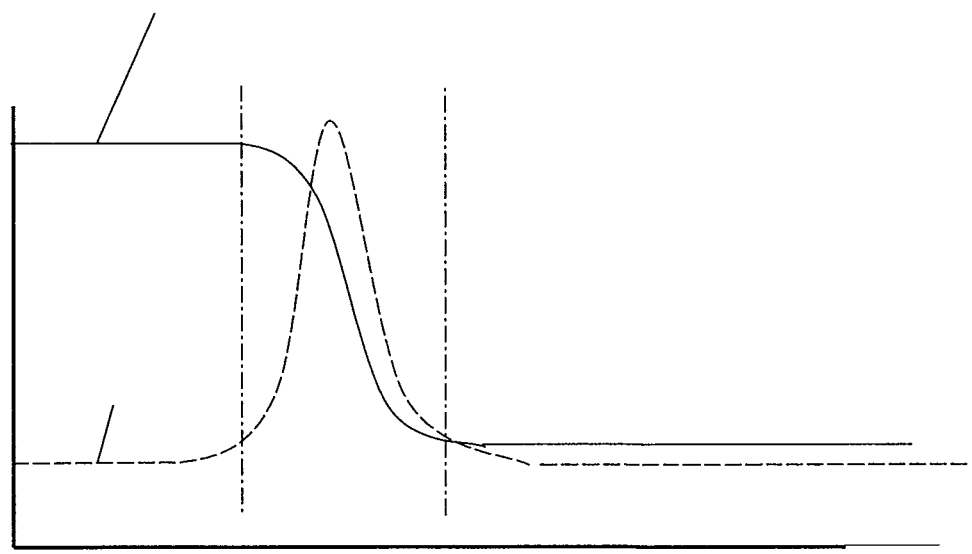
Figure 3:
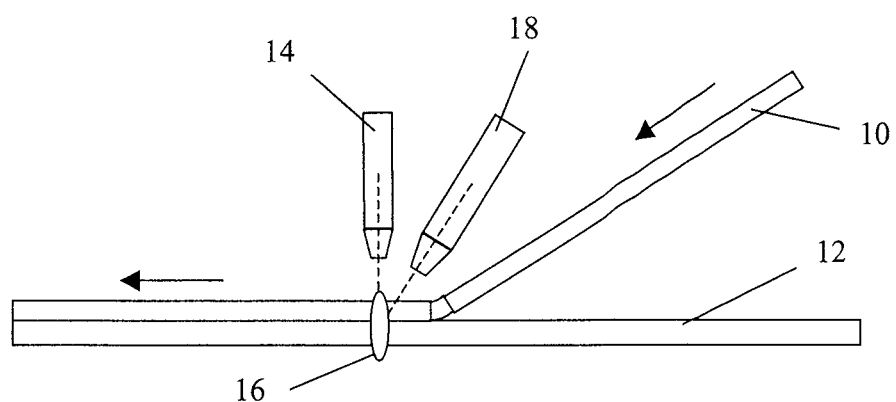

Embodiments of the present invention will now be described below, by way of illustrative example only, with reference to the accompanying figures of which:

FIG. 1 schematically illustrates ultrasonic tape laying according to the prior art;

FIG. 2 schematically illustrates a generalised plot of dynamic modulus amplitude and tangent delta against temperature for fibre reinforced matrix composite material; and FIG. 3 schematically illustrates ultrasonic tape laying in accordance with an embodiment of the present invention.

With reference to FIG. 1, a typical arrangement for performing ultrasonic tape laying of thermoset composite materials is schematically illustrated. An upper layer 10 of thermoset tape is placed on an existing, lower, layer 12 of thermoset composite material. The lower layer 12 may be a single ply of thermoset tape material or may be a stack of multiple plies that have been previously deposited. An ultrasonic transducer 14 is provided to introduce ultrasonic wave energy into the upper and lower layers of thermoset composite material within the encircled portion 16 indicated in FIG. 1. The upper and lower layers of thermoset composite material move relative to the ultrasonic transducer 14 in the direction indicated in FIG. 1, with the portion of the upper and lower layers that receive the ultrasonic wave energy from the ultrasonic transducer being proximal to the point at which the upper layer 10 of thermoset composite material is placed upon the lower layer 12 of material.

The underlying mechanism by which ultrasonic consolidation of thermoset composite materials occurs and the key characteristics of the material relevant to the mechanism can be explained with reference to FIG. 2, in which the variation of certain properties of the material to which the ultrasonic energy is applied with temperature is schematically illustrated. The solid trace 20 illustrated in FIG. 2 schematically represents the variation in the elastic modulus of a viscoelastic material with temperature, both thermoset and thermoplastic resins being examples of such viscoelastic materials. The elastic modulus of a material is a measure of the ratio stress to strain in that material when subject to vibratory forces. Viscoelastic materials such as thermoset and thermoplastic polymers typically exist in two distinct states. At lower temperatures they exist in a "glass" phase in which the material is generally hard and "glassy" and exhibits a high modulus value. This phase is represented in the trace shown in FIG. 2 as the portion between the vertical axis and the point indicated by the chained line A. At much higher temperatures the viscoelastic materials exist in an elastic phase, in which they exhibit properties of an elastic material and have a low modulus value. This phase is represented by the region to the right hand side of the chain line B in the trace shown in FIG. 2. In between these two phases the viscoelastic materials pass through a transition phase, represented as the area between chained lines A and B in FIG. 2, during which their modulus changes between the upper value of their glass phase and the lower value of their elastic phase. The temperature at which the transition phase begins, corresponding to point A in FIG. 2, is generally referred to as the glass transition temperature (Tg).

The second value indicated by the broken trace 22 in FIG. 2 is the Tan delta (Tan •) value. This value is a measure of the phase lag between the applied oscillatory force and the oscillation induced in the actual viscoelastic material and can be interpreted as a measure of the mechanical energy absorbed by the material. As indicated in FIG. 2, the maximum value of Tan delta corresponds with the centre of the glass transition phase. As will be appreciated, the higher the value of Tan delta the greater the energy that is absorbed by the viscoelastic material, which will manifest itself as localised heating, thus causing the polymer resin material to soften and flow (consolidate), whilst at the same time the ultrasonic vibrations will, given the appropriate operating conditions, cause the reinforcing fibres within the material to settle or "nest" to the desired thickness.

For thermoset composite materials typically used to fabricate fibre reinforced composite structures the glass transition generally coincides with ambient or room temperature. Consequently, the value of Tan delta is at or near its peak at room or ambient temperature and therefore the maximum amount of energy applied by the ultrasonic transducer is absorbed by the thermoset polymer material resulting in the localised heating and consolidation described above. This is the main reason why ultrasonic consolidation of thermoset composite tape is so effective.

In contrast, the glass transition temperature Tg of thermoplastic composite tape is significantly higher. For example Tg for PEEK is approximately 145° C. Therefore, at room or ambient temperature the thermoplastic material remains well within the initial glassy phase for which tan delta is relatively low and consequently very little energy is absorbed by the thermoplastic material from the ultrasonic transducer, such that little or no localised heating occurs.

Embodiments of the present invention provide a method and apparatus to overcome this problem and an embodiment is schematically illustrated in FIG. 3. In an analogous fashion to the arrangement shown in FIG. 1, upper layer 10 of thermoplastic composite material is placed upon an existing, lower, layer 12, preferably using automatic tape laying techniques and apparatus. An ultrasonic transducer 14 is provided to introduce ultrasonic wave energy to a portion 16 of the upper thermoplastic layer at a point proximal to the point at which the upper layer 10 is placed upon the lower layer 12. A localised heating source 18, which in preferred embodiments is an infrared laser, is further provided and arranged such that it locally heats either the same portion 16 of the upper layer of thermoplastic material that the ultrasonic transducer 14 injects ultrasonic wave energy into, as shown in FIG. 3, or alternatively locally heats a portion of the upper layer of thermoplastic material immediately prior to, relative to the relative movement of the upper and lower thermoplastic material layers past the ultrasonic transducer 14 and localised heating source 18, the ultrasonic transducer such that heating is effected either immediately before or simultaneously to ultrasonic wave energy being injected to the portion of the upper layer 10 of thermoplastic material that are to be consolidated. The action of the localised heating source 18, which in alternative embodiments may comprise a hot gas torch or heated roller, is preferably arranged, through a selection of heating source and heat energy to be provided, to be sufficient to locally heat the selected portion 16 of thermoplastic material to a temperature within the glass transition phase of the thermoplastic material. By virtue of pre-heating the portion of thermoplastic composite material to within the glass transition phase immediately prior to the injection of ultrasonic energy by the ultrasonic transducer 14 a greater proportion of the ultrasonic energy can be absorbed by the thermoplastic material and the ultrasonic vibrations allow the thermoplastic material to flow and consolidate, whilst also allowing the reinforcing fibres within the thermoplastic matrix to "nest" to the desired thickness in an analogous fashion to ultrasonic consolidation at room temperature at thermoset composite tape. Preferably the preheating action is arranged to raise the temperature of the composite material above the glass transition temperature Tg to a temperature that coincides with the peak value of Tan delta such that the maximum amount of ultrasonic energy can be subsequently absorbed. However preheating the composite material to within a temperature range encompassing the Tan delta peak, for example a range from the glass transition temperature Tg to approximately 5° C. above the peak Tan delta temperature, brings improvements to the amount of ultrasonic energy absorbed by the composite material and allows efficient ultrasonic consolidation.

Although the above embodiment of the present invention has been described in the context of ultrasonic tape or fibre laying, i.e. continuously laying a thermoplastic tape and performing ultrasonic consolidation as the tape is laid, the principles of the present invention apply to other embodiments in which the thermoplastic tape may be applied manually, or applied manually in larger sheets, and the combined thermal and ultrasonic consolidation performed as a subsequent, separate, process step. It will also be appreciated that although infrared laser heating is particularly suitable to causing the localised heating of the thermoplastic composite tape, because the carbon reinforced composite material is dark coloured and therefore absorbs the infrared energy very well, any other localised heating technique that can perform the required localised heating at the desired speed for use may be utilised and falls within embodiments of the present invention.

The invention claimed is:
1. A method of fabricating a fibre reinforced thermoplastic composite structure comprising:
   placing a first layer of fibre reinforced thermoplastic material on top of a second layer of fibre reinforced thermoplastic material;
   providing a local heating source and locally heating a portion of at least the upper layer of thermoplastic composite material; and
   providing an ultrasonic transducer and locally introducing ultrasonic energy waves to the heated portion of the thermoplastic material such that ultrasonic consolidation of the fibre reinforced thermoplastic occurs, wherein the portion of fibre reinforced thermoplastic material is locally heated to a temperature within a range extending substantially from the glass transition temperature and extending to a temperature 5° C. above a temperature corresponding to a peak value of the Tan delta of the thermoplastic material.

2. The method of claim 1, wherein the first layer of fibre reinforced thermoplastic material is provided in a continuous length and is placed onto the second layer of fibre reinforced thermoplastic material in a continuous manner.

3. The method of claim 2, wherein the local heating and introduction of ultrasonic energy occur at a portion proximal to a point at which the first layer of fibre reinforced thermoplastic material is placed onto the second layer.

4. The method of claim 1, wherein the portion of fibre reinforced thermoplastic material is locally heated to a temperature substantially equal to a temperature corresponding to the peak value of the Tan delta of the temperature material.

5. The method of claim 1, wherein the local heating source comprises an infrared laser.

6. A fibre reinforced thermoplastic composite structure manufactured according to the method of claim 1.

7. A method of fabricating a fibre reinforced thermoplastic composite structure comprising:
   placing a first layer of fibre reinforced thermoplastic material on top of a second layer of fibre reinforced thermoplastic material;
   providing a local heating source and locally heating a portion of at least the upper layer of thermoplastic composite material; and
   providing an ultrasonic transducer and locally introducing ultrasonic energy waves to the heated portion of the thermoplastic material such that ultrasonic consolidation of the fibre reinforced thermoplastic occurs, wherein the portion of fibre reinforced thermoplastic material is locally heated to a temperature within a range extending substantially from the glass transition temperature and extending to a temperature 5° C. above a temperature corresponding to a peak value of the Tan delta of the thermoplastic material, and wherein relative movement occurs between on the one hand the first layer of fibre reinforced thermoplastic material and on the other hand the localised heating source and ultrasonic transducer.

* * * * *